US009099850B2

(12) United States Patent
 Kakimi

(10) Patent No.: US 9,099,850 B2
(45) Date of Patent: Aug. 4, 2015

(54) ELECTRICAL JUNCTION BOX

(71) Applicant: Yazaki Corporation, Tokyo (JP)

(72) Inventor: Takaaki Kakimi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/180,519

(22) Filed: Feb. 14, 2014

(65) Prior Publication Data

US 2014/0231129 A1    Aug. 21, 2014

(30) Foreign Application Priority Data

Feb. 18, 2013   (JP) ................................ 2013-028597

(51) Int. Cl.
 *H02G 3/08*      (2006.01)
 *H01H 9/04*      (2006.01)
 *H01H 9/02*      (2006.01)

(52) U.S. Cl.
 CPC ................. *H02G 3/088* (2013.01); *H01H 9/04* (2013.01); *H01H 9/02* (2013.01); *H02G 3/08* (2013.01)

(58) Field of Classification Search
 CPC ......... H02G 3/08; H02G 3/081; H02G 3/088; H02G 3/16; H05K 5/00; H05K 5/02; H05K 5/04; B60R 16/00; B60R 16/0239; B60R 16/02; H01H 9/02; H01H 9/04; B65D 21/086; B65D 43/22

USPC .................... 174/50, 520, 59, 535, 559, 560; 439/76.1, 76.2, 949, 535; 361/600, 361/601, 679.01, 730, 752, 760, 761
See application file for complete search history.

(56) References Cited

U.S. PATENT DOCUMENTS

| | | | | |
|---|---|---|---|---|
| 6,462,270 | B1 * | 10/2002 | Depp et al. ...................... | 174/50 |
| 8,420,931 | B2 * | 4/2013 | Soh et al. ........................ | 174/50 |
| 8,633,383 | B2 * | 1/2014 | Akahori et al. ................. | 174/50 |
| 8,785,775 | B2 * | 7/2014 | Takeuchi et al. ................ | 174/50 |
| 8,878,059 | B2 * | 11/2014 | Makino ........................... | 174/50 |
| 8,969,723 | B2 * | 3/2015 | Hirasawa et al. ............... | 174/50 |

FOREIGN PATENT DOCUMENTS

JP    2012-055108 A    3/2012

* cited by examiner

*Primary Examiner* — Angel R Estrada
(74) *Attorney, Agent, or Firm* — Locke Lord LLP

(57) ABSTRACT

An electrical junction box includes: a frame; and a block having a double wall defined by outer and inner walls. At a position where the double wall and a component receiving section of the block are opposite to each other, a lower end of the inner wall is positioned higher than a component insertion surface at a lower end of the component receiving section, and a waterproof wall is provided on the lower end and an outer edge at the double wall side of the component receiving section. The waterproof wall is defined by a first waterproof portion extended horizontally toward the outer wall from the lower end and the outer edge at the double wall side of the component receiving section, and a second waterproof wall extended downward and parallel to the outer wall from an end at the outer wall side of the first waterproof wall.

3 Claims, 7 Drawing Sheets

ELECTRICAL JUNCTION BOX

CROSS REFERENCE TO RELATED APPLICATIONS

This application is on the basis of Japanese Patent Application No. 2013-028597, the contents of which are hereby incorporated by reference.

TECHNICAL FIELD

The present invention relates to an on-vehicle electrical junction box.

BACKGROUND ART

An on-vehicle electrical junction box has various structures. For example, an electrical junction box 301 as shown in FIG. 7 includes: a frame 303; and a block 306 received in the frame 303. The frame 303 is provided with a double wall 330 as a waterproof structure (for example, see PTL 1).

The structure of the above electrical junction box 301 will be explained in more detail. The electrical junction box 301 includes: the above frame :303; the above block 306; a plurality of components such as a relay, a fuse, a bus bar, and an electric wire with a terminal (in FIG. 7, these components are omitted) attached to the block 306; an upper cover 304 attached to an upper end of the frame 303; and a lower cover 395 attached to a lower end of the frame 303. These frame 303, block 306, upper cover 304, and lower cover 305 are made of synthetic resin.

As described above, the frame 303 has the double wall 330 as the waterproof structure. The double wall 330 is composed of an outer wall 331 and an inner wall 332 having a gap therebetween. As shown by an arrow D in FIG. 7, the water entering from a mating portion between the frame 303 and the upper cover 304 is guided through a gap between the outer will 331 and the inner wall 332, and ejected outside from a not-shown drain hole on the lower cover 305.

The above block 306 has a plurality of component receiving sections to which the above components are respectively attached. Further, as shown in FIG. 7, in a component receiving section 360 arranged opposite to the double wall 330, a plurality of fuses are received in an upper end side, namely, the upper cover 304 side, and a plurality of electric wires with terminals and the bus bars are received in a lower end side, namely, the lower cover 305 side. Further, the terminals of the electric wires with terminals are received in the component receiving section 360, and the electric wires are guided out of the component receiving section 360.

Further, in a position where the double wall 330 and the component receiving section 360 are opposite to each other, a lower end 332b of the inner wall 332 is extended lower than a component insertion surface 361 disposed at the lower end of the component receiving section 360 so as to avoid soaking the fuses and the terminals of the electric wires in the water passing between the outer wall 331 and the inner wall 332. Here, the component insertion surface 361 disposed at the lower end of the component receiving section 360 is a surface where cavities for receiving the electric wires with terminals and the bus bars are opened.

CITATION LIST

Patent Literature
PTL 1: JP, A, 2012-55108

SUMMARY OF INVENTION

Technical Problem

As described above, in the above conventional electrical junction box 301, it is necessary to extend the inner wall 332 lower than the component insertion surface 361. Therefore, a space between the outer wall 331 and the inner wall 332 becomes long in a vertical direction, and a shape of a molding die for forming this portion becomes oblong. Therefore, there is a problem that the demoldability is bad. If the demoldability is bad, a molding product is easy to be deformed when releasing the product from the molding die.

Accordingly, an object of the present invention is to provide an electrical junction box of which frame is provided with a double wall able to improve the demoldability of a molding die without reducing a waterproof performance.

Solution to Problem

For attaining the object, according to a first aspect of the present invention, there is provided an electrical junction box including:
a frame having a double wall defined by an outer wall and an inner wall disposed with a gap between the inner wall and the outer wall; and
a block received in the frame and having at least one component receiving section,
wherein at a position where the double wall and the at least one component receiving section are opposite to each other, a lower end of the inner wall is extended to at least an upper end of the opposite component receiving section and positioned higher than a component insertion surface at a lower end of the component receiving section, and
wherein a waterproof wall extended toward the outer wall or extended lower than the component insertion surface is provided on the lower end and an outer edge at the double wall side of the opposite component receiving section.

According to a second aspect of the present invention, there is provided the electrical junction box as described in the first aspect,
wherein the waterproof wall is defined by a first waterproof wall extended toward the outer wall from the lower end of the opposite component receiving section and from the outer edge of the opposite component receiving section at the double wall side, and a second waterproof wall extended downward and parallel to the outer wall from an end of the first waterproof wall at the outer wall side.

According to a third aspect of the present invention, there is provided the electrical junction box as described in the first aspect,
wherein the opposite component receiving section is partially extended lower than the component insertion surface, and
wherein the waterproof wall is defined by a portion lower than the component insertion surface.

Advantageous Effects of Invention

According to the invention described in the first to third aspects, because the waterproof wall is provided, even when the lower end of the inner wall is positioned higher than the component insertion surface at the lower end of the component receiving section, the water passing between the outer wall and the inner wall is prevented from soaking the components attached to the component receiving section. Further, because a space between the outer wall and the inner wall can be shortened in a vertical direction, a shape of a molding dire for forming it can be shortened. Thereby, the demoldability of the molting die can be improved. Further, because the demoldability of the molding die is improved, a molding product is prevented from being deformed. Further, because the inner wall can be shortened, the electrical junction box can be light-weighted.

DESCRIPTION OF EMBODIMENTS

First Embodiment

An electrical junction box according to a first embodiment of the present invention will be explained with reference to FIGS. 1 to 5.

Figure 1:
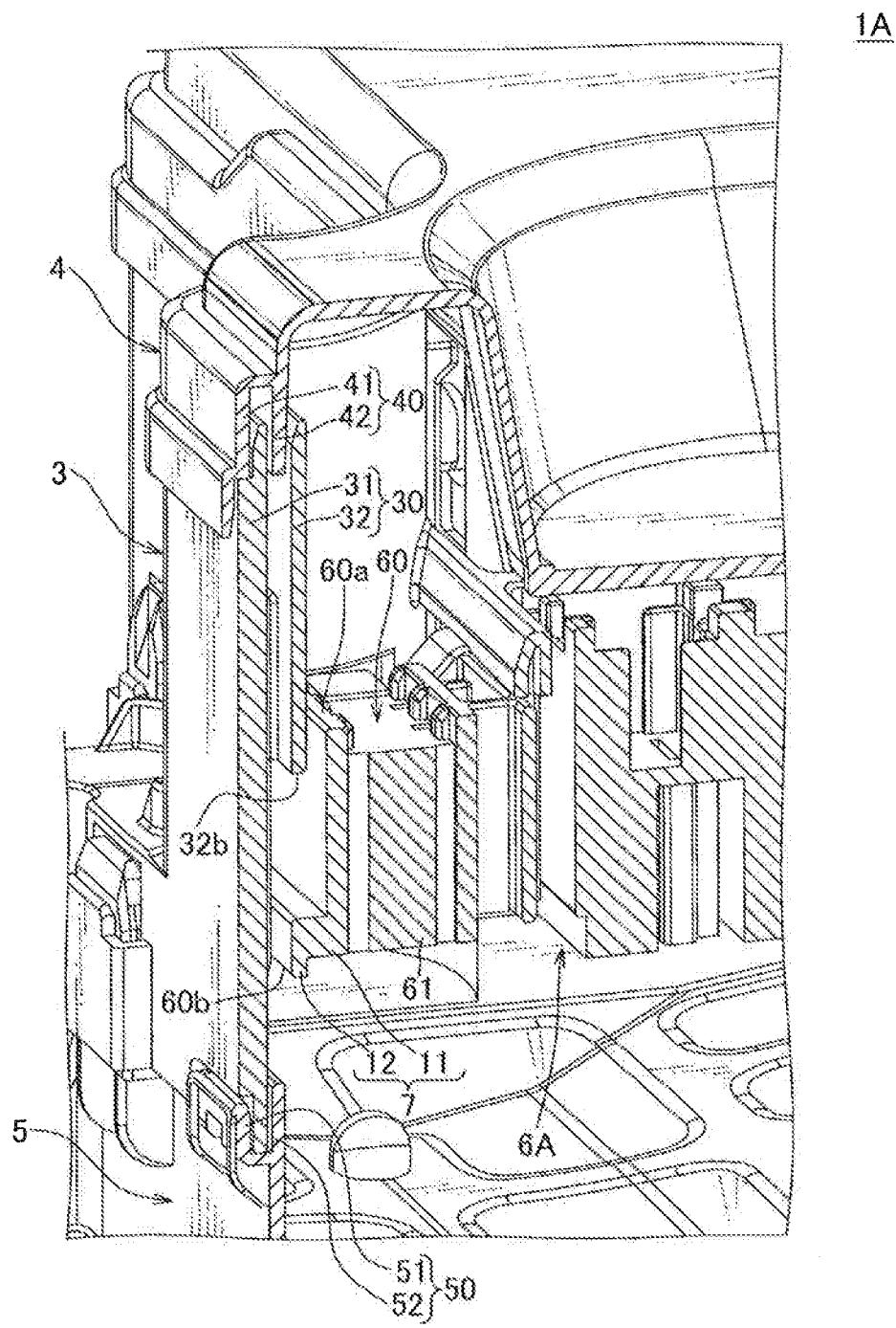
FIG. 1 is a sectional perspective view of an electrical junction box according to a first embodiment of the present invention.
Figure 2:
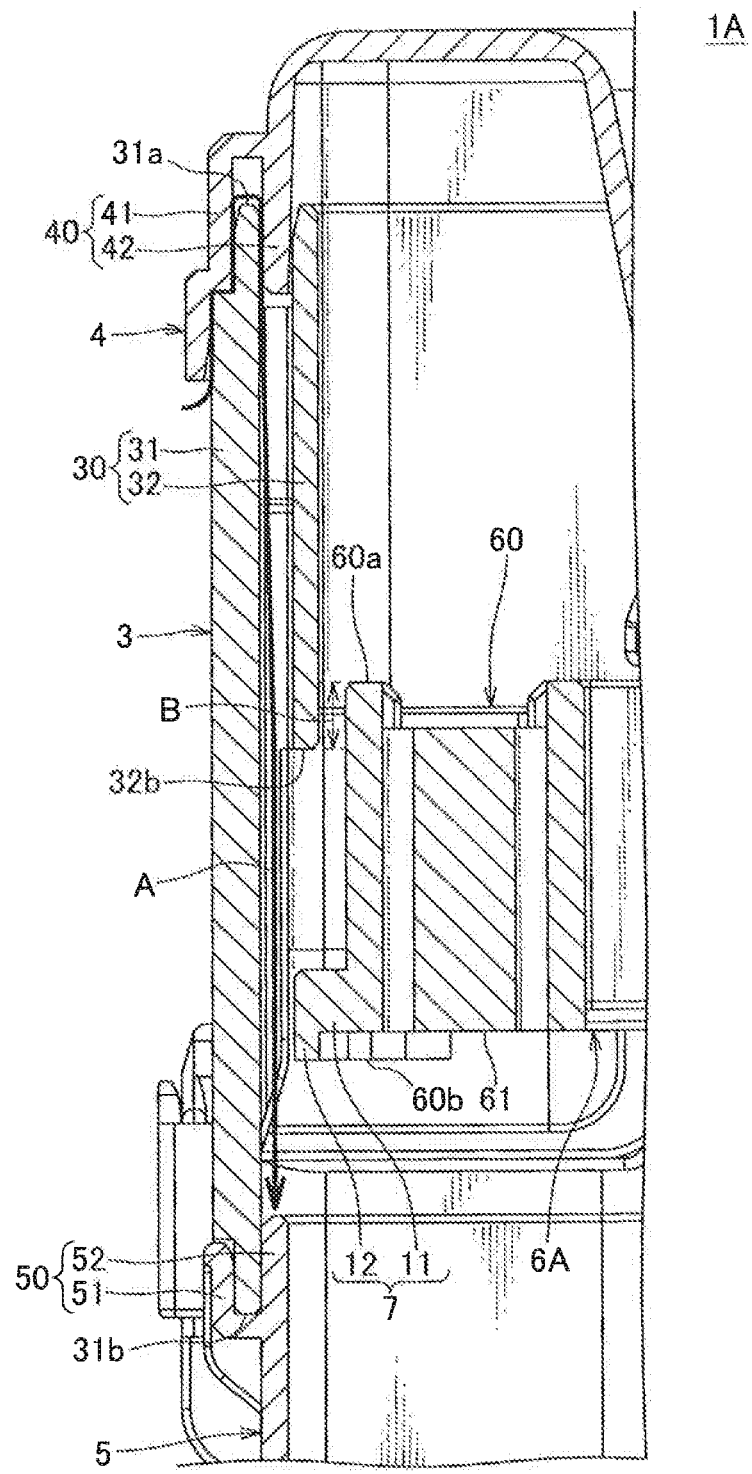
FIG. 2 is a sectional view showing a position where a double wall and a component receiving section of the electrical junction box shown in FIG. 1 are opposite to each other.

An electrical junction box 1A shown in FIGS. 1 and 2 is mounted on a vehicle, and includes: a frame 3; a block 6A received in the frame 3; a plurality of components such as a relay, a fuse, a bus bar, and an electric wire with a terminal (in FIGS. 1 and 2, these components are omitted) attached to the block 6A; an upper cover 4 attached to an upper end of the frame 3; and a lower cover 5 attached to a lower end of the frame 3. These frame 3, block 6A, upper cover 4, and lower cover 5 are made of synthetic resin, and formed by injection molding with a molding die.

Figure 3:
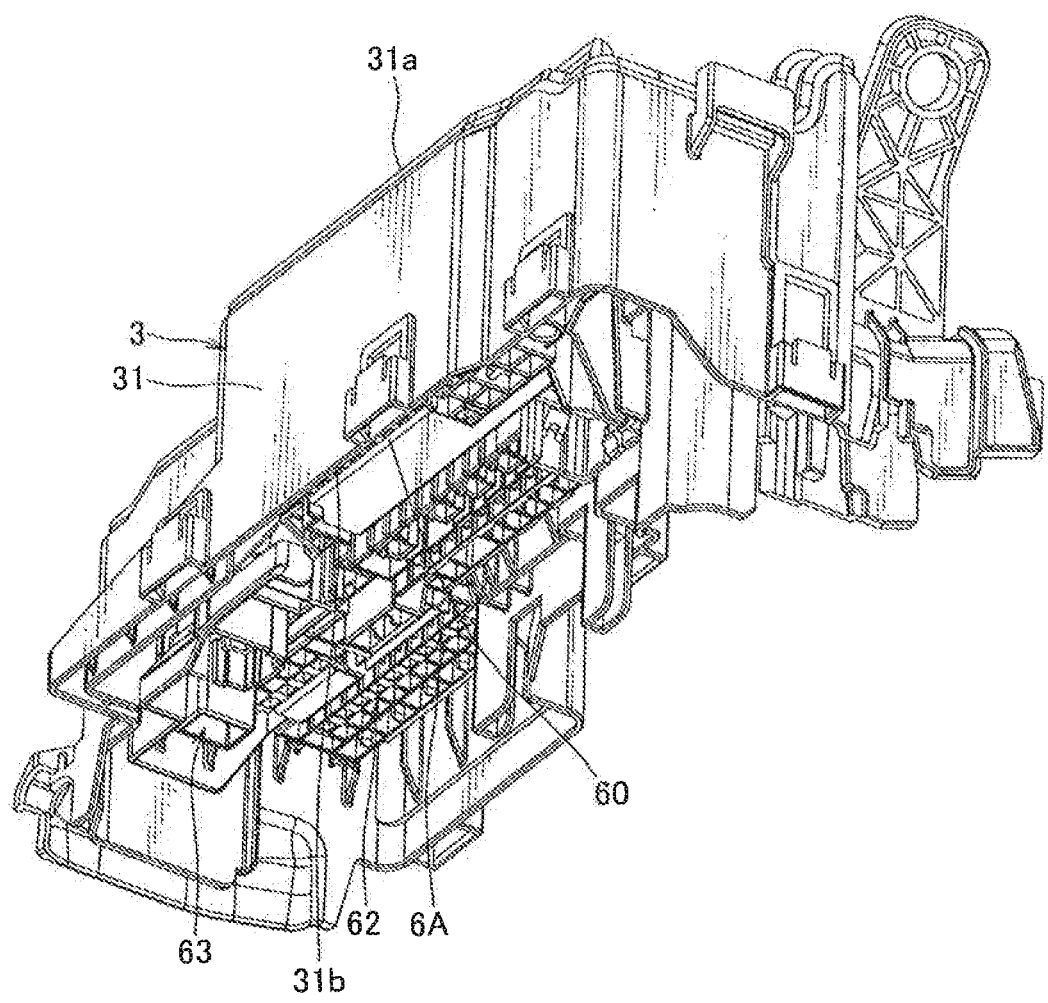
FIG. 3 is a perspective view showing a frame and a block shown in FIG. 1.
Figure 4:
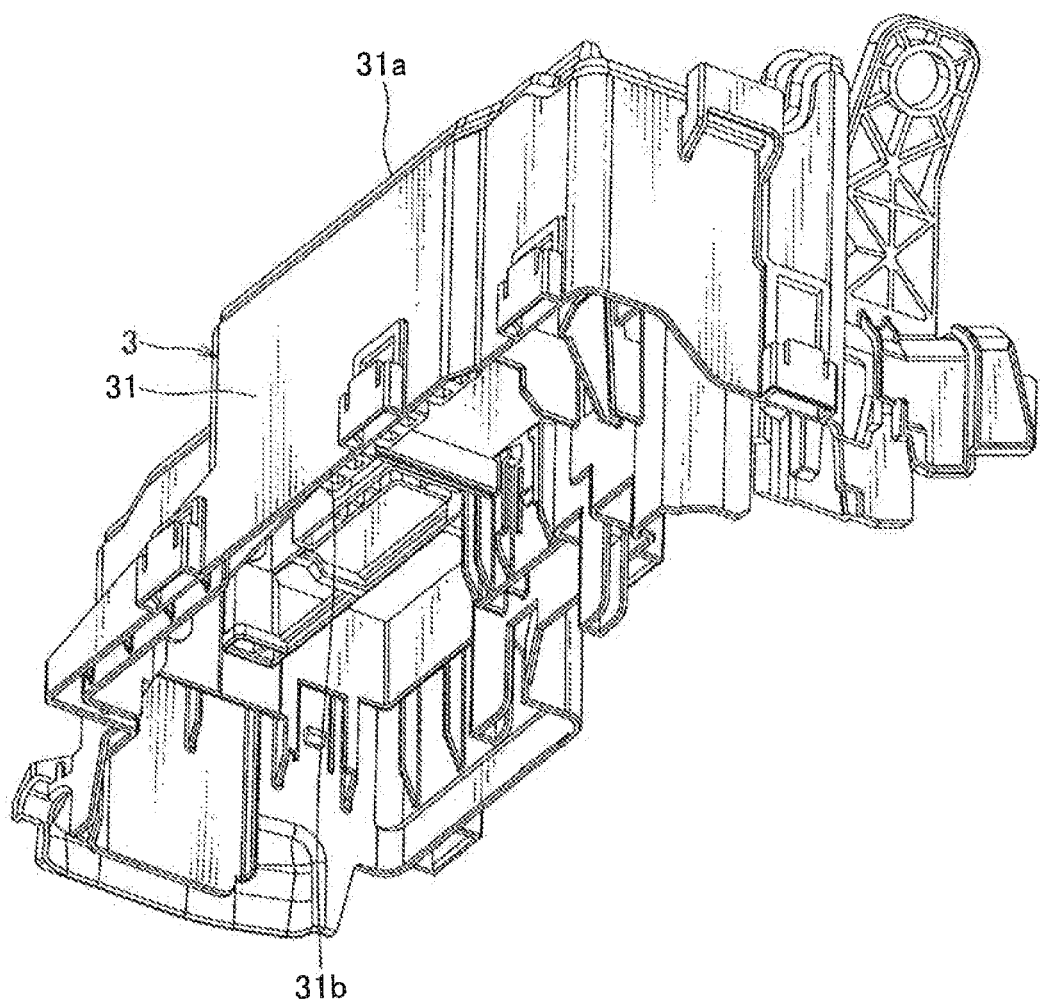
FIG. 4 is a perspective view showing only the frame shown in FIG. 3.

As shown in FIGS. 3 and 4, the frame 3 is totally in a frame shape, and has a double wall 30 as a waterproof structure. The double wall 30 is defined by an outer wall 31 and an inner wall 32 having a gap between the inner wall 32 and the outer wall 31. Further, the upper cover 4 also has a double wall 40 defined by an outer wall 41 and an inner wall 42. Similarly the lower cover 5 has a double wall 50 defined by an outer wall 51 and an inner wall 52. In a condition that the upper cover 4 and the lower cover 5 are attached to the frame 3, an upper end 31a of the outer wall 31 of the frame 3 is positioned between the double wall 40 of the upper cover 4, and a lower end 31b of the outer wall 31 of the frame 3 is positioned between the double wall 50 of the lower cover 5.

Further, as shown by an arrow A in FIG. 2, the water entering from a mating portion between the frame 3 and the upper cover 4 is guided through a gap between the double wall 30 of the frame 3, namely, between the outer wall 31 and the inner wall 32, and ejected outside from a not-shown drain hole on the lower cover 5.

Figure 5:
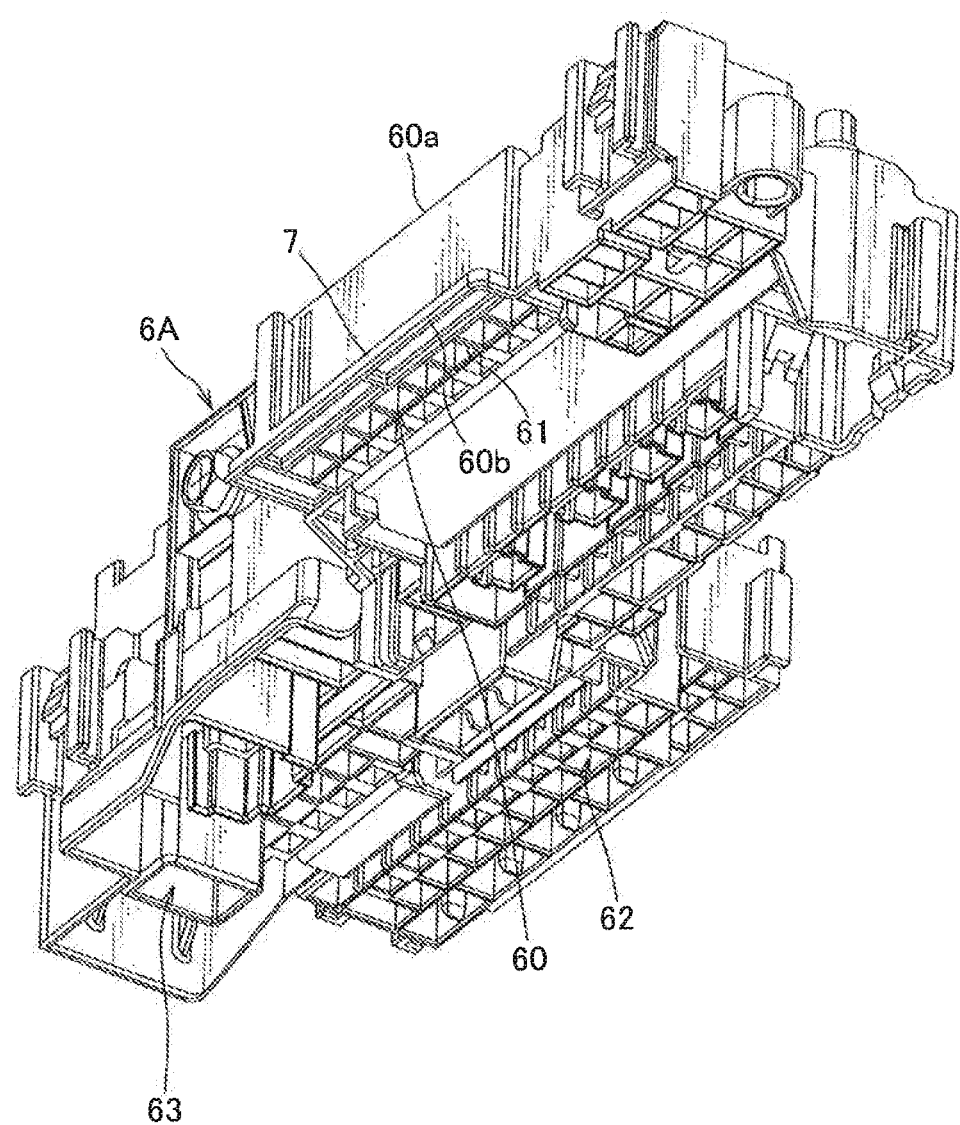
FIG. 5 is a perspective view showing only the block shown in FIG. 3.

As shown in FIG. 5, the block 6A has a plurality of component receiving sections 60, 62, 63 to which the above components are respectively attached. Further, as shown in FIG. 2, in the component receiving section 60 arranged opposite to the double wall 30 of the frame 3, a plurality of fuses are received in an upper end 60a side, namely, the upper cover 4 side, and a plurality of electric wires with terminals and the bus bars are received in a lower end 60b side, namely, the lower cover 5 side. Further, the terminals of the electric wires with terminals are received in the component receiving section 60, and the electric wires are guided out of the component receiving section 60.

Incidentally, according to the present invention, the double wall 30 may be provided on a whole circumference of the frame 3, and may be provided partially. Further, according to the present invention, the block 6A may have at least one component receiving section arranged opposite to the double wall 30 of the frame 3.

Further, at a position where the double wall 30 of the frame 3 and the component receiving section 60 are opposite to each other, a lower end 32b of the inner wall 32 is positioned higher than a component insertion surface 61 at the lower end 60b of the opposite component receiving section 60, and a waterproof wall 7 is provided on the lower end of the component receiving section 60 and on an outer edge of the component receiving section 60 at the double wall 30 side. The component insertion surface 61 at the lower end 60b of the component receiving section 60 is a surface where cavities for receiving the electric wires with terminals and the bus bars are opened. Further, in this embodiment, an overlapping range between the inner wall 32 and the component receiving section 60 in a vertical direction (shown by B in FIG. 2) is 5 mm. However, according to the present invention, the lower end 32b of the inner wall 32 may be extended to at least the upper end 60a of the opposite component receiving section 60.

The above waterproof wall 7 is defined by a first waterproof wall 11 extended horizontally toward the outer wall 31 from the lower end of the component receiving section 60 and from an outer edge of the component receiving section 60 at the double wall 30 side, and a second waterproof wall 12 extended downward and parallel to the outer wall 31 from an end of the first waterproof wall at the outer wall 31 side.

According to such an electrical junction box 1A, because the waterproof wall 7 is provided, even when the lower end 32b of the inner wall 32 is positioned higher than the component insertion surface 61 at the lower end 60b of the component receiving section 60, the water passing between the outer wall 31 and the inner wall 32 is prevented from soaking the components (specifically, fuses and terminals of electric wires with terminals) attached to the component receiving section 60. Further, because a space between the outer wall 31 and the inner wall 32 can be shortened in a vertical direction, a shape of a molding dire for forming the double wall 30 can be shortened.

Thereby, the demoldability of the molding die can be improved. Further, because the demoldability of the molding die is improved, a molding product, namely, the frame 3 is prevented from being deformed. Further, because the inner wall 32 can be shortened, the electrical junction box can be light-weighted.

Second Embodiment

Figure 6:
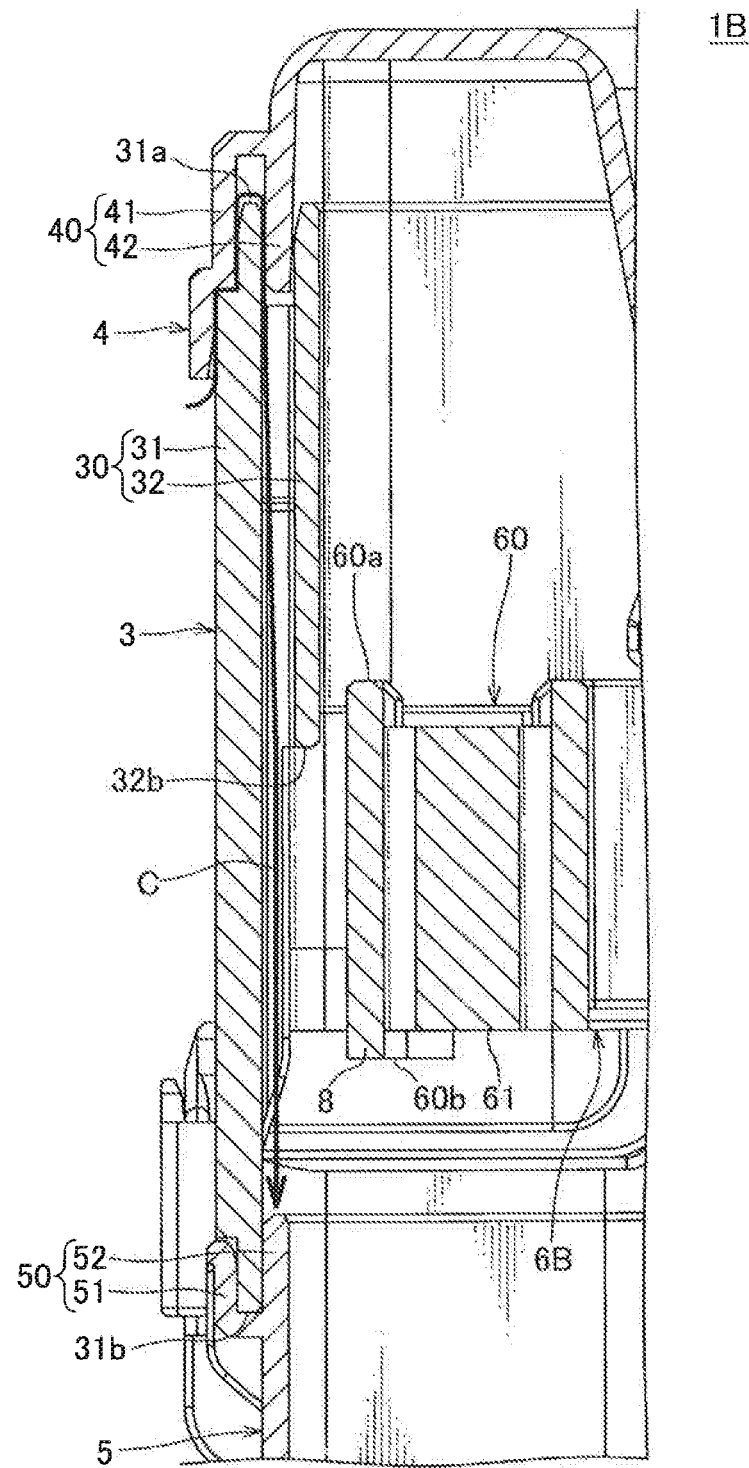
FIG. 6 is a sectional view showing a position where a double wall and a component receiving section of an electrical junction box according to a second embodiment of the present invention are opposite to each other.
Figure 7:
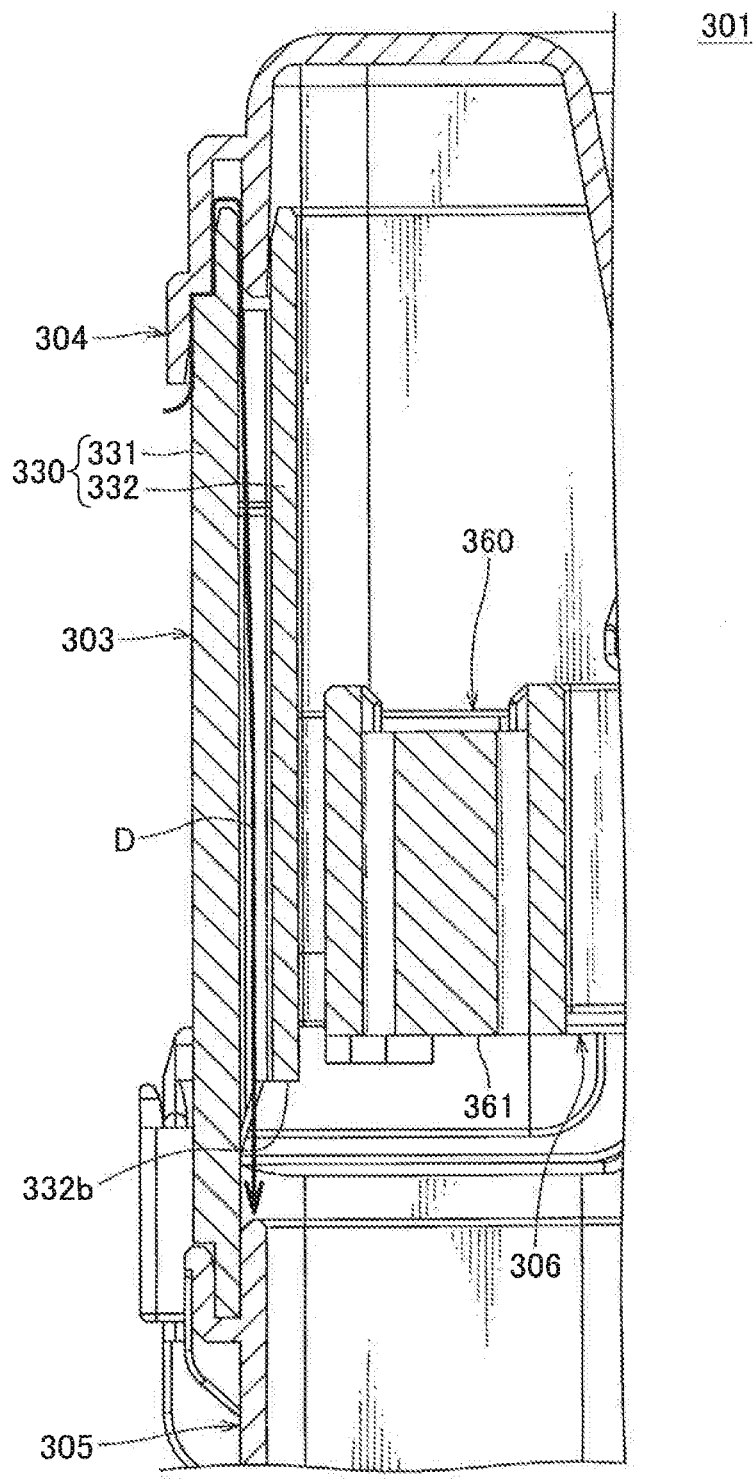
FIG. 7 is a sectional view showing a position where a double wall and a component receiving section of a conventional electrical junction box are opposite to each other.

An electrical junction box according to a second embodiment of the present. invention will be explained with reference to FIG. 6. Further, in FIG. 6, the same components as the first embodiment are denoted by the same reference signs, and an explanation thereof is omitted.

In an electrical junction box 1B of this embodiment, at a position where the double wall 30 of the frame 3 and the component receiving section 60 of a block 6B are opposite to each other, the lower end 32b of the inner wall 32 is positioned higher than the component insertion surface 61 at the lower end 60b of the opposite component receiving section 60, and a waterproof wall 8 is provided on the lower end of the component receiving section 60 and on an outer edge of the component receiving section 60 at the double wall 30 side.

In the above block 6B, the component receiving section 60 is partially extended lower than the component insertion surface 61, and the waterproof wall 8 is defined by a portion lower than the component insertion surface 61. Namely the waterproof wall 8 is a portion extended straight downward from the component insertion surface 61 at the lower end of the component receiving section 60 and at an outer edge of the double wall 30.

Similar to the electrical junction box 1A of the first embodiment, in such an electrical junction box 1B, because the waterproof wall 8 is provided, even when the lower end 32b of the inner wall 32 is positioned higher than the component insertion surface 61 at the lower end 60b of the component receiving section 60, the water passing between the outer wall 31 and the inner wall 32 (an entry pathway of the water is shown by an arrow C in FIG. 6) is prevented from soaking the components attached to the component receiving section 60.

Other than the above waterproof walls 7, 8, the waterproof wall of the present invention may be a wall extended horizontally toward the outer wall 31 from the lower end of the component receiving section 60 and the outer edge of the component receiving section 60 at the double wall side (namely, defined by only the first waterproof wall 11 of the first embodiment), or may be a wall extended obliquely downward toward the outer wall 31. Namely, the waterproof wall of the present invention may be a wall provided on the lower end and on the outer edge at the double wall 30 side of the component receiving section 60 opposite to the double wall 30, and extended toward the outer wall 31 or extended lower than the component insertion surface 61.

Further, because the waterproof wall 8 is extended straight downward from the component insertion surface 61, the waterproof wall 8 has high waterproof performance. However, when a component such as an electric wire with a terminal is inserted into the component receiving section 60, the waterproof wall works as an obstruction and insertion workability is reduced. In contract, in a case of the above waterproof wall extended horizontally toward the outer wall 31, a component is easily inserted into the component receiving section 60, but the waterproof performance is lower than the waterproof wall 8 of the second embodiment. Therefore, in the present invention, a shape of the waterproof wall can be properly decided in view of the insertion workability upon inserting a component into the component receiving section 60 and the waterproof performance in response to an installation location, a required condition and the like.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

REFERENCE SIGNS LIST 1A, 1B electrical junction box
3 frame
6A, 6B block
7, 8 waterproof wall
11 first waterproof wall
12 second waterproof wall
30 double wall
31 outer wall
32 inner wall
60 component receiving section
61 component insertion surface

What is claimed is:
1. An electrical junction box comprising:
a frame having a double wall defined by an outer wall and an inner wall disposed with a gap between the inner wall and the outer wall; and
a block received in the frame and having at least one component receiving section,
wherein at a position where the double wall and the at least one component receiving section are opposite to each other, a lower end of the inner wall is extended to at least an upper end of the opposite component receiving section and positioned higher than a component insertion surface at a lower end of the component receiving section, and
wherein a waterproof wall extended toward the outer wall or extended lower than the component insertion surface is provided on the lower end and an outer edge at the double wall side of the opposite component receiving section.
2. The electrical junction box as claimed in claim 1, wherein the waterproof wall is defined by a first waterproof wall extended toward the outer wall from the lower end of the opposite component receiving section and from the outer edge of the opposite component receiving section at the double wall side, and a second waterproof wall extended downward and parallel to the outer wall from an end of the first waterproof wall at the outer wall side.
3. The electrical junction box as claimed in claim 1, wherein the opposite component receiving section is partially extended lower than the component insertion surface, and
wherein the waterproof wall is defined by a portion lower than the component insertion surface.

* * * * *